US006212555B1

(12) United States Patent
Brooks, Jr. et al.

(10) Patent No.: US 6,212,555 B1
(45) Date of Patent: Apr. 3, 2001

(54) AUDIO TRANSFER, STORAGE AND PLAYBACK SYSTEM

(76) Inventors: William E. Brooks, Jr.; William G. Brooks, both of P.O. Box 925, Daphne, AL (US) 36526

( * ) Notice: Subject to any disclaimer, the term of this patent is extended or adjusted under 35 U.S.C. 154(b) by 0 days.

(21) Appl. No.: 09/213,312

(22) Filed: Dec. 16, 1998

Related U.S. Application Data

(60) Provisional application No. 60/108,564, filed on Nov. 16, 1998.

(51) Int. Cl.[7] ..................................................... G06F 15/16
(52) U.S. Cl. ............................. 709/219; 709/217; 381/86
(58) Field of Search ............................... 455/72, 345, 3.2, 455/12.1, 3.1, 6.3, 4.2; 709/219; 381/86; H04H 1/00, 1/02; H04B 1/00, 7/00; G06F 15/16

(56) References Cited

U.S. PATENT DOCUMENTS 5,303,393 * 4/1994 Noreen et al. ......................... 455/3.2
5,848,398 * 12/1998 Martin et al. ......................... 705/14

* cited by examiner

*Primary Examiner*—Nathan Flynn
*Assistant Examiner*—Vivek Srivastava
(74) *Attorney, Agent, or Firm*—Gardner, Carton & Douglas

(57) ABSTRACT

A system for providing recorded audio programming in digital form, comprising a computer server capable of digitally recording, holding and uploading audio programming in either musical or voice formats and able to transmit such modulated digital data in a time-compressed, encrypted and encoded manner through a wireless transmission, where the data is received using RF electronics, then stored for transfer to a combination audio receiver/player/data storage device. This storage device comprises a readable/writable memory storage mechanism (e.g., disk drive, hard drive, memory or flash card system) and playback or player feature interfaced with a mobile or fixed site RF receiver capable of receiving wireless transmissions. As the transmissions are received, the programming data is demodulated and stored in digital form and then converted to "real time" audio one file at a time, utilizing a digital-to-analog converter, and played back to the listener.

25 Claims, 3 Drawing Sheets

AUDIO TRANSFER, STORAGE AND PLAYBACK SYSTEM

This application claims the benefit of a provisional application filed Nov. 16, 1998 and assigned Ser. No. 60/108,564 filed Nov. 16, 1998.

BACKGROUND OF THE INVENTION

This invention relates generally to the field of audio record and playback devices (cassette players and tapes, compact disc players and CDs, etc.), and more particularly to the such devices which incorporate digitally stored audio data on a stationary or removable memory device such as a computer disk drive or flash card which is converted into an audio output. Even more particularly, the invention relates to such devices where the data storage and output device is portable and provided with means to receive and store data from a computer server capable of high speed delivery of audio programming in the form of time-compressed, encrypted and encoded data.

Radio has been available for many years, and provides the consumer with a selection of audio programming directed at different tastes. The radio signal is locally broadcast and thus limited in range to the power of the transmitter and the quality of the receiver. The consumer is at the mercy of the radio programmer, in that the material transmitted is chosen by the radio station, and the only option available to the consumer is to change stations. Certain musical or informational formats may not even be available in a given locale. Because of these limitations, cassette players and compact disc (CD) players have become very popular. The cassette or CD players give the listener control of the format—the listener can play whatever prerecorded cassette or CD he or she desires at any time. The downside to these devices is that the consumer must individually purchase the cassettes or CDs (buying new CDs or cassettes when new artists arise or new work is produced by familiar artists), the cassettes or CDs have limited storage capacity, the user must transport a large number of cassettes or CDs to provide a range of choices or preselect certain CDs or cassettes based on the listener's mood when a portable player is utilized (either a personal device carried by the listener or a player in a car), and the listener is stuck with cassettes or CDs which he or she no longer desires to listen to, or which turn out to be not as good as originally anticipated prior to purchase.

It is an object of this invention to provide an audio player device and system which is capable of storing a relatively large amount of audio programming, whether music or voice, in a digital data format with relatively instant access to any piece of stored data for playback, where the stored data may be replaced with new data when the listening desires of the consumer change. It is a further object to provide such a device and system where the transfer of data to the audio player device is accomplished through alternative communication means in a time-compressed manner with a computer server having a substantially greater storage capacity than the audio player device, such that the consumer can choose from a vast array of data encompassing all formats of musical and voice programming. It is a further object to provide such a device and system where the data stored in the computer server is received via wireless transmission.

SUMMARY OF THE INVENTION

The invention is a system for providing recorded audio programming in digital form in an audio player device where the consumer chooses the particular programming so recorded, and further where the recorded programming is replaceable periodically. The system comprises a computer server capable of digitally recording, holding and uploading audio programming in either musical or voice formats and able to transmit such modulated digital data in a time-compressed, encrypted and encoded format through a wireless transmission, where the data is stored for transfer to a combination audio receiver/player/data storage device, hereafter referred to as an audio receiver/player device. This storage device comprises a readable/writable memory storage mechanism (e.g., disk drive, hard drive, memory or flash card system) and playback or player feature interfaced with a mobile or fixed site radio receiver capable of receiving wireless transmissions. As the transmissions are received through the antenna assembly, using the receiver's RF electronics, the programming signal is demodulated and then stored in digital form within the storage device as a buffer to be accessed by the playback mechanism, in effect, delaying the playback of the received data until the audio works are needed. The compressed data is then converted to "real time" audio, utilizing a digital-to-analog converter, one file at a time and played back to the listener. As each file is played back, the listener may choose to save the file for future replay or do nothing. If the latter occurs, the storage device would default to over-write or replace the file with a new file or files of similar size. The listener could also elect to skip the file. As before, the storage device would replace the skipped file with a new one. As available memory allows, additional audio works will continue to be received and stored until the data storage device is filled to capacity, even as the consumer simultaneously listens to a previously received file. The storage device is designed to have a relatively limited storage capacity, such that only a chosen number of files, such as 25 or 50 for example, could be stored at any one time.

These new files are constantly being fed through a wireless transmission, such as a satellite or cellular transmission as described above. The data storage mechanism therefore, is constantly refreshing the database as old files are expended by the listener. As an option, the audio receiver/player device could have access to a modem, which would allow the listener to request custom files using a conventional voice/data 2-way communications gateway (e.g., telephone, cellular, pager, etc.) between the consumer and the computer server. The computer server would then send the requested file to the consumer's audio receiver/player device via a separate wireless transmission. These custom files could include, but are not limited to, weather reports, sports scores, books on audio, foreign language lessons, etc. The audio receiver/player device may provide means to display alphanumeric information related to the data chosen to be played. This display may also show other information such as traffic and weather reports.

DETAILED DESCRIPTION OF THE INVENTION

The invention will now be described in detail with regard for the best mode and the preferred embodiment. In general, the invention is a system comprising a computer server and the wireless means to transfer selected data in time-compressed, encrypted and encoded manner from the computer server to an audio receiver/player device capable of storing, decoding and playing the data in an audio format.

Figure 1:
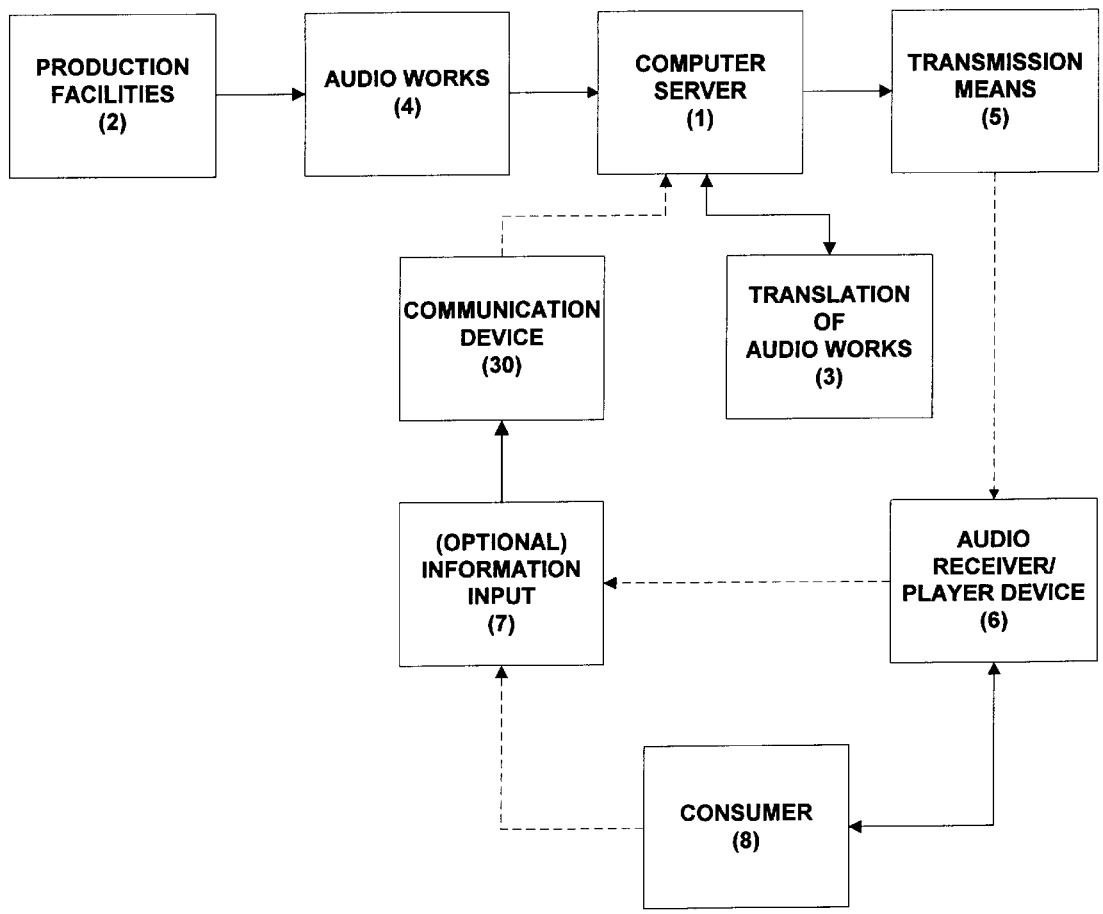
FIG. 1 is a block diagram of the overall audio transfer, storage and playback system of the present invention.

Turning to FIG. 1 the computer server (1) is a computer or communicating computer network associated with production facilities (2) similar to standard production studios for radio broadcasting, in that the production facilities (2) will have music or voice recording libraries of prerecorded music or voice offerings on standard recording media (tapes, CDs, etc.), and means to record and store live music or spoken offerings. The recorded musical works will be categorized as to format, such as classical, jazz, contemporary, rap, etc., and the recorded spoken works will also be categorized as to format, such as commentators, instructional, books-on-audio, etc. The computer server (1) translates (3) and stores the audio works (4) in digital form, in time-compressed, encoded and encrypted manner, with the works subdivided into different formats. The computer server (1) is further capable of communication with transmission means (5) to deliver the data stored in the computer to a computer or microprocessor (10) which is a component of an audio receiver/player device (6). An optional information input means (7) is provided for the consumer (8) to enter required instructions and identification data for communication with the computer server via a modem communication device (30) and may be controlled using keypad, keyboard or voice activation devices in known manner.

Figure 2:
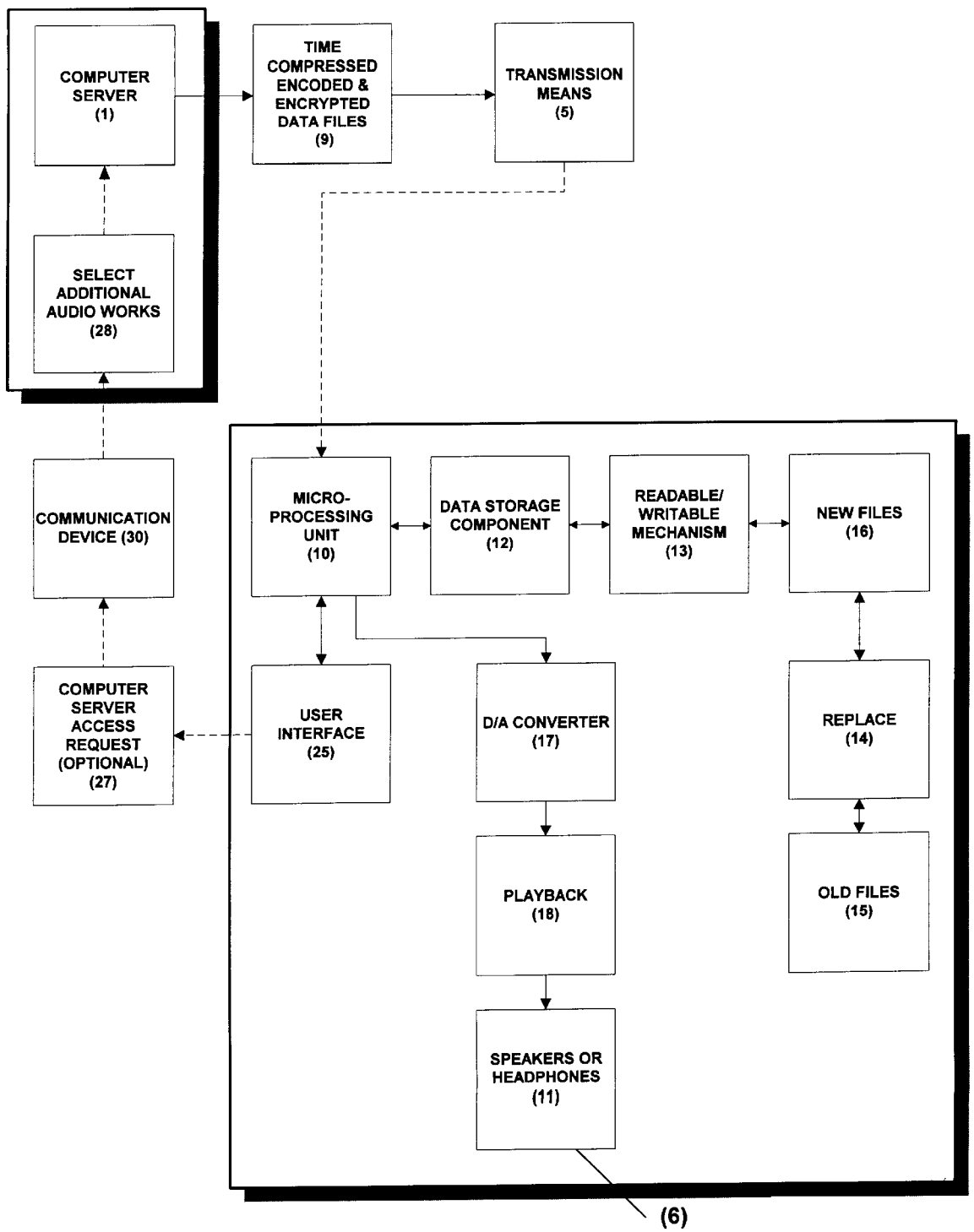
FIG. 2 is a block diagram or the audio receiver/player device.

As shown in FIG. 2, the transmission means (5) delivers time-compressed, encoded and encrypted data (9) from the computer server (1) to portable or fixed audio receiver/player devices (6). Preferably this transmission means (5) comprises a transmitter capable of sending modulated data via an extremely high data transfer rate wireless system, and may comprise satellite, radio, microwave, cellular or other known wireless transmissions using terrestrial or satellite means. It is contemplated that such transfer of data from the computer server (1) to the audio receiver/player devices (6) could also be accomplished through direct physical connections (e.g., telephone lines). A wireless system will incorporate compression technology, which will be used to relay analog and digital signals which may use time division, multiplexers and audio compressors/decompressors to achieve high-speed transmission rates.

The audio receiver/player device (6) may be a completely portable device d/c powered device which can be carried by the user, with the audio output delivered through small speakers or headphones (11). Alternatively, the audio receiver/player device may be designed to be a stand-alone unit for use in the home or office and powered conventionally by electricity, or a unit installed in an automobile in manner similar to standard cassette or CD players. The data storage component means (12) of the audio receiver/player device (6) could be removable for transport or even interchangeable with other audio receiver/player devices. The audio receiver/player device (6) is a microprocessing unit (10), antenna and RF electronics system comprised of data storage means (12), preferably consisting of a disk drive, hard drive, memory or flash card system capable of storing a large amount of audio programming in digital format in individual files, but with a readable/writable storage mechanism (13) that will replace or write over (14) the old data file (15) with one or more new ones (16), until the data storage device is fully loaded. The audio receiver/player device further comprises means to decode and convert (17) the digitized digital data using a D/A converter to convert the digitized data to an analog signal audio output, as well as means to select and play (18) any particular audio work relatively instantaneously via channel selector (19), start (20), stop (21), skip (22), repeat (23) and save (24) buttons, and preferably visual display means (25) to display alphanumeric information about the work selected, as shown FIG. 3.

The system allows a consumer, via the optional information means (7), to input entirely new recorded data into the audio receiver/player device on a continual basis (26). The consumer contacts the computer server in the required communicating manner and enters personal identification data, such as a personal identification number (PIN), social security number, password or the like, into the computer server. This information is modulated on a carrier signal and transmitted to a computer server through a conventional voice-data 2-way communications gateway for verification. If the account is current, access to the stored data in the computer server is allowed (27). The consumer then selects the desired audio works to be transferred (28) and the digital data is downloaded from the computer server into the data storage component of the audio receiver/player device. The consumer is then able to listen to entirely different audio selections from those previously recorded in the audio receiver/player device. The computer server can also be set up to allow the consumer to order CDs or cassettes for delivery by mail.

Figure 3:
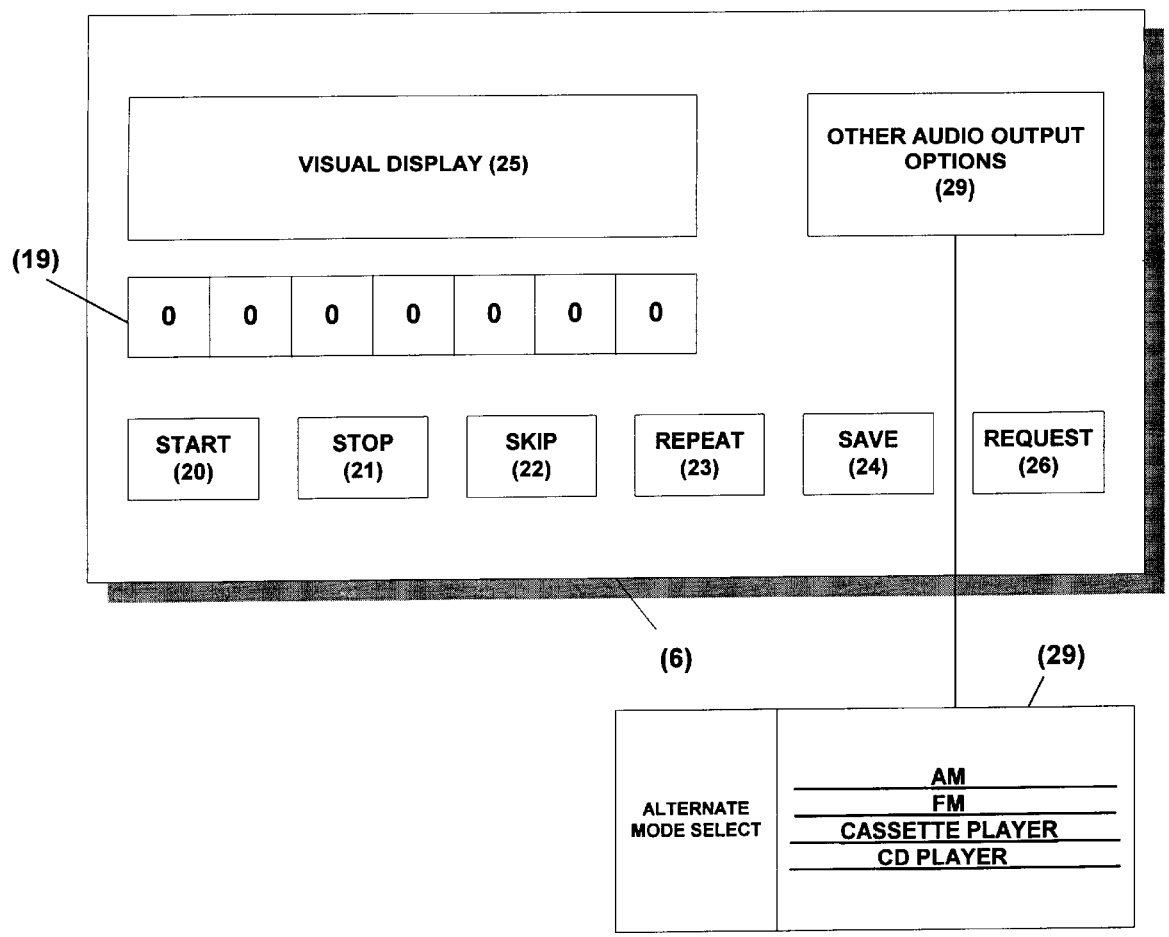
FIG. 3 is a block diagram of the audio receiver/player device user interface.

As further illustrated in FIG. 3, the invention may also be packaged with a standard AM/FM radio, cassette player or compact disc player, such that the listener has other options for audio output (29).

It is contemplated that equivalents and substitutions for certain components may be obvious to those skilled in the art, however the described combination of components and elements which comprise the system are believed to be novel and non-obvious, and as such the true scope and definition of the invention is to be as set forth in the following claims.

What is claimed is:

1. A system for programming, broadcasting, selecting, manipulating and playback of audio works, the system comprising:

(A) a computer server, associated with production facilities, which stores audio programming in a digital file format as audio works files, said server including means to program and constantly broadcast said audio works files as time-compressed individual digital files to a plurality of wireless transmission means and to a plurality of audio receiver/player devices;

(B) each said plurality of wireless transmission means broadcasts said time-compressed audio works files constantly being supplied from said computer server to each of said plurality of audio receiver/player devices; and (C) each said plurality of audio receiver/player devices having means for receiving said programmed time-compressed audio works files from said computer server through said wireless transmission means, data storage means and processing means for storing said time-compressed transmission as a plurality of said individual audio works files, and means to convert said stored time-compressed audio works files to a real-time user manipulatable audio output for playing back at least one of said plurality of said individual audio works files one file at a time, only once, without said user input or previous knowledge.

2. The system of claim 1, where said data storage means comprises a microprocessor memory system.

3. The system of claim 2, where said data storage means further comprises readable/writable memory storage whereby said individual file which has been converted to a real-time audio output is replaced by a new individual file containing a newly received audio work.

4. The system of claim 3, where said data storage means comprises one of the group consisting of a disk drive, a hard drive, a RAM memory or a flash memory.

5. The system of claim 1, where said wireless transmission means comprises satellite transmission means.

6. The system of claim 1, where said wireless transmission means comprises terrestrial RF transmission means.

7. The system of claim 1, where said computer server further comprises means to encode said audio works, said transmission means further comprises means to transmit said encoded audio works, and said audio receiver/player means further comprises means to decode said encoded audio works.

8. The system of claim 1, where said audio receiver/player device is portable.

9. The system of claim 1, where said audio receiver/player device is mounted in a vehicle.

10. The system of claim 1, where said audio receiver/player device comprises means to select a particular individual file for conversion and audio play.

11. The system of claim 1, where said audio receiver/player device further comprises access to a modem, whereby specific audio works may be designated for transmission from said computer server to said audio receiver/player device.

12. The system of claim 1, whereby said audio works files are prioritized for playback, as well as replaced without user input.

13. The system of claim 1 whereby said audio works files are manipulated by said user by said devices to perform start, stop, skip, repeat, and save functions.

14. The system of claim 1 whereby a custom file is requested by said user via a modulator-demodulator and at least one of said plurality of audio receiver/player devices.

15. The system of claim 3, wherein said data storage means is removable for transport.

16. The system of claim 3, wherein said data storage means is interchangeable with any of said plurality of audio receiver/player devices data storage means.

17. The system of claim 1 wherein said data storage means defaults to automatically overwrite or replace said audio works file with a at least one new file of similar size if the file is not saved by the user.

18. The system of claim 1 wherein said data storage means defaults to automatically replace a user-skipped audio works file with a new file or files of similar size.

19. The system of claim 1 wherein additional audio works files are continuously received and stored by said data storage means until said data storage means is filled to capacity, even as said user simultaneously listens to a previously received file.

20. The system of claim 1, wherein said wireless transmission means comprises direct physical connections.

21. The system of claim 1, wherein at least one of said plurality of audio receiver/player devices comprises a stand-alone unit.

22. The system of claim 1, wherein at least one of said plurality of audio receiver/player devices further comprises a standard AM/FM radio, cassette player or compact disc player.

23. The system of claim 11, wherein said audio receiver/player device activates a modulator-demodulator to access said time-compressed audio works by a verification process.

24. A system for transmission, storage, programming, broadcasting, selecting, manipulating and playback of audio works, the system comprising:

(A) a computer server, associated with production facilities, which stores audio programming in a digital file format as audio works files, said server including means to program and broadcast said audio works files as time-compressed individual digital files to a plurality of wireless transmission means and to a plurality of audio receiver/player devices;

(B) each said plurality of wireless transmission means broadcasts said time-compressed audio works from said computer server to each of said plurality of audio receiver/player devices; and (C) each said plurality of audio receiver/player devices having means for receiving said programmed time-compressed audio works files in real-time from said computer server through said wireless transmission means, data storage means and processing means for storing said time-compressed transmission as a plurality of select individual audio works files, and means to convert said stored time-compressed audio works files to a real-time user manipulatable audio output; and wherein said data storage means defaults to automatically overwrite or replace said audio works file with at least one new file of similar size as each file is played back if the file is not saved by the user until said data storage means is filled to capacity, even as said user listens to a previously received file.

25. A system for transmission, storage, programming, broadcasting, selecting, manipulating and playback of audio works, the system comprising:

(A) a computer server, associated with production facilities, which stores audio programming in a digital file format as audio works files, said server including means to program and broadcast said audio works as time-compressed individual digital files to a plurality of wireless transmission means and to a plurality of audio receiver/player devices;

(B) each said plurality of wireless transmission means broadcasts said time-compressed audio works from said computer server to each of said plurality of audio receiver/player devices;

(C) each said plurality of audio receiver/player devices having means for receiving said programmed time-compressed audio works files in real-time from said computer server through said wireless transmission means, data storage mean and processing means for storing said time-compressed transmission as a plurality of select individual audio works files, and means to convert said stored time-compressed audio works files to a real-time user manipulatable audio output; and wherein additional audio works files are continuously received and stored by said data storage means until said data storage means is filled to capacity, even as said user simultaneously listens to a previously received file.

* * * * *